US005790136A

United States Patent [19]

Hoffert et al.

[11] Patent Number: 5,790,136

[45] Date of Patent: *Aug. 4, 1998

[54] INTERLEAVING PIXEL DATA FOR A MEMORY DISPLAY INTERFACE

[75] Inventors: Bradley W. Hoffert; Shawn F. Storm, both of Mountain View; Robert Mark Stano, Sunnyvale; Horace Arlen Olive, Jr., San Jose, all of Calif.

[73] Assignee: Sun Microsystems, Inc., Mountain View, Calif.

[*] Notice: The term of this patent shall not extend beyond the expiration date of Pat. No. 5,608,427.

[21] Appl. No.: 780,902

[22] Filed: Jan. 9, 1997

Related U.S. Application Data

[63] Continuation of Ser. No. 392,022, Feb. 21, 1995, Pat. No. 5,608,427, which is a continuation of Ser. No. 164,319, Dec. 9, 1993, and a continuation-in-part of Ser. No. 983,779, Dec. 1, 1992, Pat. No. 5,404,318.

[51] Int. Cl.$^6$ .......... G06T 1/20

[52] U.S. Cl. .......... 345/506; 345/508; 345/213

[58] Field of Search .......... 395/501, 506, 395/505, 509, 508, 520, 521; 345/201, 185, 189, 213

[56] References Cited

U.S. PATENT DOCUMENTS

| | | | |
|---|---|---|---|
| 4,617,564 | 10/1986 | Yoshioka | 340/798 |
| 5,014,128 | 5/1991 | Chen | 358/160 |
| 5,404,318 | 4/1995 | Hoffert et al. | 364/551.01 |
| 5,587,726 | 12/1996 | Moffat | 345/201 |
| 5,608,427 | 3/1997 | Hoffert et al. | 345/201 |

FOREIGN PATENT DOCUMENTS

| | | | |
|---|---|---|---|
| A-0 314922 | 9/1988 | European Pat. Off. | G09G 1/16 |
| A-0 328356 | 2/1989 | European Pat. Off. | G09G 1/16 |

*Primary Examiner*—Kee M. Tung

*Attorney, Agent, or Firm*—Blakely Sokoloff Taylor & Zafman

[57] ABSTRACT

A method and apparatus is disclosed for interleaving the transfer of pixel data from a dual bank frame buffer to a memory display interface. The interleaved transfer of pixel data to the memory display interface enables upgrade of existing memory display interface designs to higher density VRAM chips in order to increase the capacity of the frame buffer.

9 Claims, 7 Drawing Sheets

INTERLEAVING PIXEL DATA FOR A MEMORY DISPLAY INTERFACE

This is a continuation of application Ser. No. 08/392,022, filed Feb. 21, 1995 now U.S. Pat. No. 5,608,427, which is a continuation of application Ser. No. 08/164,319 filed Dec. 9, 1993 and a Continuation-In-Part of Ser. No. 983,779 filed Dec. 1, 1992, now U.S. Pat. No. 5,404,318.

BACKGROUND OF THE INVENTION

1. Field of the Invention

This invention relates to the architecture of computer graphics display systems. More particularly this invention relates to a method and apparatus for interleaving pixel data transfer from a frame buffer to a memory display interface.

2. Art Background

In a typical computer graphics system, a video random access memory (VRAM) frame buffer stores pixel data for rendering images on a display device. A memory display interface may be employed to process the pixel data for the display device. The memory display interface processes the pixel data at programmable pixel rates and pixel depths, and implements special pixel functions. Pixel processing at programmable pixel rates enables support of display devices having differing characteristics (resolution, video timing, etc.), and support of VRAM frame buffers having differing access speeds. Processing of pixels having programmable pixel depths increases software compatibility.

The capacity of the frame buffer in existing systems can be increased by upgrading to higher density VRAM chips. The higher density VRAM chips require less space on a printed circuit board for a given frame buffer capacity. However, VRAM manufacturers have increased VRAM chip densities by increasing the number of bit planes in the VRAMs, rather than by increasing the depth of the VRAMs. For example, 256K by 4 bit VRAMs have evolved to 256K by 8 bit VRAMs to provide greater density. The 256K by 8 bit VRAMs reduce by one half the number of VRAM chips required for a given frame buffer capacity when compared with 256K by 4 bit VRAMs.

Unfortunately, the increased number of bit planes in the higher density VRAM chips requires an increase in the width of the video bus between the frame buffer and the memory display interface. For example, an existing system having eight 256K by 4 bit VRAMs may have a 32 bit video bus for transferring the pixel data from the frame buffer to the memory display interface. If the frame buffer capacity is doubled by upgrading to eight 256K by 8 bit VRAMs, the width of the video bus must increase to 64 bits to accommodate the increased number of bit planes. The increased width of the video bus requires a major redesign of the memory display interface, as well as major modifications to the printed circuit board layout. The major design modifications greatly increases the cost of upgrading existing systems.

As will be described, the present invention is a method and apparatus for interleaving pixel data transfer from a frame buffer to a memory display interface, which provides increased frame buffer capacity for existing memory display interface designs.

SUMMARY OF THE INVENTION

A method and apparatus is disclosed for interleaving the transfer of pixel data from a dual bank frame buffer to a memory display interface. Interleaving pixel data transfer to the memory display interface enables an upgrade of existing memory display interface designs to higher density VRAM chips in order to increase the capacity of the frame buffer.

A clock circuit within the memory display interface is driven by state machines. The clock circuit synchronizes pixel data transfer between each bank of the frame buffer and the input of the memory display interface. The clock circuit generates a first shift clock signal (VSCLK_A) in a first state to cause a first VRAM bank (VRAM-A) to access bank A pixel data. The clock circuit then generates a second shift clock signal (VSCLK_B) in the first state to cause a second VRAM bank (VRAM-B) to access bank B pixel data.

The clock circuit enables and disables the output drivers of the first and second VRAM banks in order to prevent video bus contentions and excessive power consumption. The clock circuit generates a first serial output enable signal (SOE_A) in a first state to cause the first VRAM bank to transmit the pixel data to the memory display interface over a video bus. The clock circuit then generates the first serial output enable signal in the second state to disable the first VRAM bank from transmitting the pixel data over the video bus.

The clock circuit generates a second serial output enable signal in the second state to cause the second VRAM bank to transmit the pixel data to the memory display interface over a video bus. The clock circuit then generates the second serial output enable signal in the first state to disable the second VRAM bank from transmitting the second set of pixel data over the video bus.

The clock circuit inhibits the first and second shift clock signals during retrace intervals of the corresponding display device. The first and second shift clock signals and the first and second serial output enable signals are synchronized by a pixel clock signal corresponding to the display device.

DETAILED DESCRIPTION OF THE INVENTION

A method and apparatus is disclosed for interleaving pixel data transfer from a frame buffer to a memory display interface to enable increased frame buffer capacity for existing memory display interface designs. In the following description, for purposes of explanation, specific circuit devices, circuit architectures and components are set forth in order to provide a more thorough understanding of the present invention. However, it will be apparent to one skilled in the art that the present invention may be practiced without the specific details. In other instances while known circuits and devices are shown in schematic form in order not to obscure the present invention unnecessarily.

Figure 1:
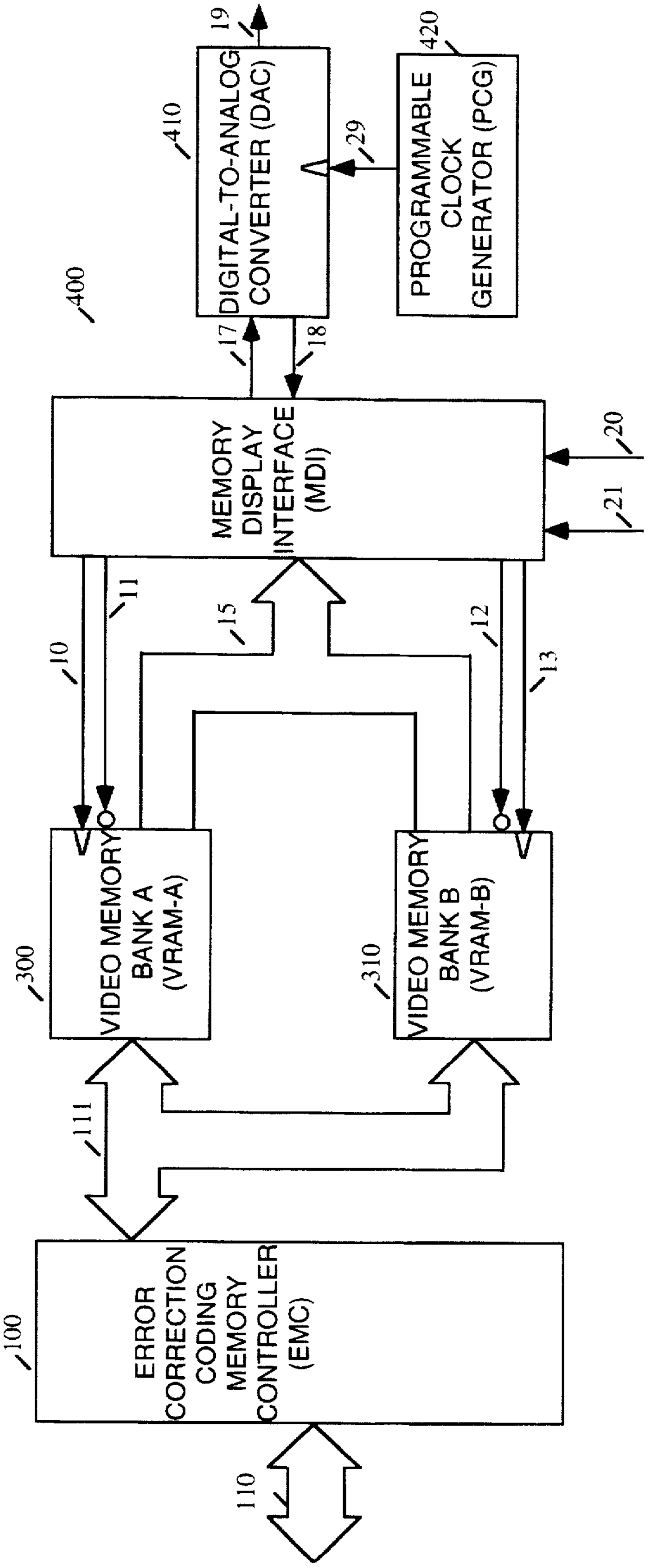
FIG. 1 is a block diagram of a video subsystem including a frame buffer and a memory display interface, wherein the frame buffer is comprised of two banks of VRAMs.

Referring now to FIG. 1, a block diagram of a video subsystem having a frame buffer and a memory display interface is shown. An error correction coding memory controller (EMC) 100 is shown coupled to communicate over a microprocessor bus 110. The EMC 100 is a memory controller for a pair of video memory banks, a VRAM-A 300 and a VRAM-B 310. The combination of the VRAM-A 300 and the VRAM-B 310 function as a frame buffer for pixel data transferred over the microprocessor bus 110. The EMC 100 communicates with the VRAM-A 300 and the VRAM-B 310 over a memory bus 111.

A memory display interface (MDI) 400 performs look-up table functions and special pixel functions on the pixel data transferred from the VRAM-A 300 and the VRAM-B 310, through the MDI 400, to a digital to analog converter (DAC) 410. The MDI 400 generates color pixel data for display on a graphics display device (not shown).

The output drivers of the VRAM-A 300 are enabled and disabled by a serial output enable signal (SOE_A) 11, and the output drivers of the VRAM-B 310 are enabled and disabled by a serial output enable signal (SOE_B) 12. The VRAM-A 300 transmits pixel data over a video bus 15 to the MDI 400 on the rising edge of a video shift clock signal (VSCLK_A) 10. The VRAM-B 310 transmits pixel data over the video bus 15 to the MDI 400 on the rising edge of a video shift clock signal (VSCLK_B) 13.

For one embodiment, the video bus 15 is 128 bits wide, which enables transfer of data for multiple pixels in parallel to the MDI 400. The MDI 400 processes pixels in three pixel depth modes: 32 bit pixel depth mode, 16 bit pixel depth mode, and 8 bit pixel depth mode. In 32 bit pixel depth mode, the MDI 400 receives 32 bit wide pixel data over the video bus 15. In 16 bit pixel depth mode, 16 bit wide pixels are received, while in 8 bit pixel depth mode 8 bit wide pixels are received. Thus, in 32 bit pixel depth mode, four pixels are transferred to the MDI 400 in parallel over the video bus 15 on the rising edges the VSCLK_A 10 and the VSCLK_B 13. In 16 bit pixel depth mode, eight pixels are transferred in parallel, and in 8 bit pixel depth mode, sixteen pixels are transferred in parallel over the video bus 15.

After performing look-up table functions and special pixel functions on the pixel data received over the video bus 15, the MDI 400 transfers color pixel data to the DAC 410 over a pixel bus 17. The DAC 410 converts the digital color pixel data into analog signals, thereby generating video signals 19 for the display device. The video signals 19 comprised red, green, and blue video signals, as well as sync signals for the display device.

A processor (not shown) controls the pixel processing functions of the MDI 400 by programming a set of internal registers inside the MDI 400. The internal registers of the MDI 400 determine the pixel width, monitor timing parameters, the VRAM mode, as well as programmable pixel functions such as blending and lookup table functions. The processor accesses the internal registers of the MDI 400 over a data bus 21 and an address bus 20. The processor also accesses the lookup tables within the MDI 400 over the data bus 19 and the address bus 20.

For one embodiment, it is preferable that the data bus 21 comprise 8 bits, and the address bus 20 comprise 2 bits in order to minimize the pin count of the MDI 400. The processor accesses internal registers and lookup tables of the MDI 400 by loading high and low portions of an internal address register over the data bus 21. After loading a base address into the internal address register, the processor performs auto-increment reads and writes to transfer information to and from the MDI 400 internal registers and lookup tables.

The processor accesses a master control register (MCR) and an auxiliary control register (ACR) in order to control pixel processing functions and the VRAM mode. For one embodiment, bits 4 and 5 of the MCR register determine the pixel depth mode: 32 bit pixel depth mode, 16 bit pixel depth mode, and 8 bit pixel depth mode. Bit 0 of the ACR controls the VRAM mode; either single bank or dual bank.

For one embodiment, the VRAM-A 300 and the VRAM-B 310 are each comprised of sixteen 256K×8 bit VRAM chips when the VRAM mode is dual bank. In dual bank VRAM mode, the VRAM-A 300 and the VRAM-B 310 alternately transfer 128 bits of pixel data over the video bus 15 according to the VSCLK_A 10 and the VSCLK_B 13. In single bank mode, the VRAM-A 300 is comprised of sixteen 256K×8 bit VRAM chips. The VRAM-A 300 transfers 128 bits of pixel data over the video bus 15 concurrently according to the VSCLK_A 10.

Figure 2:
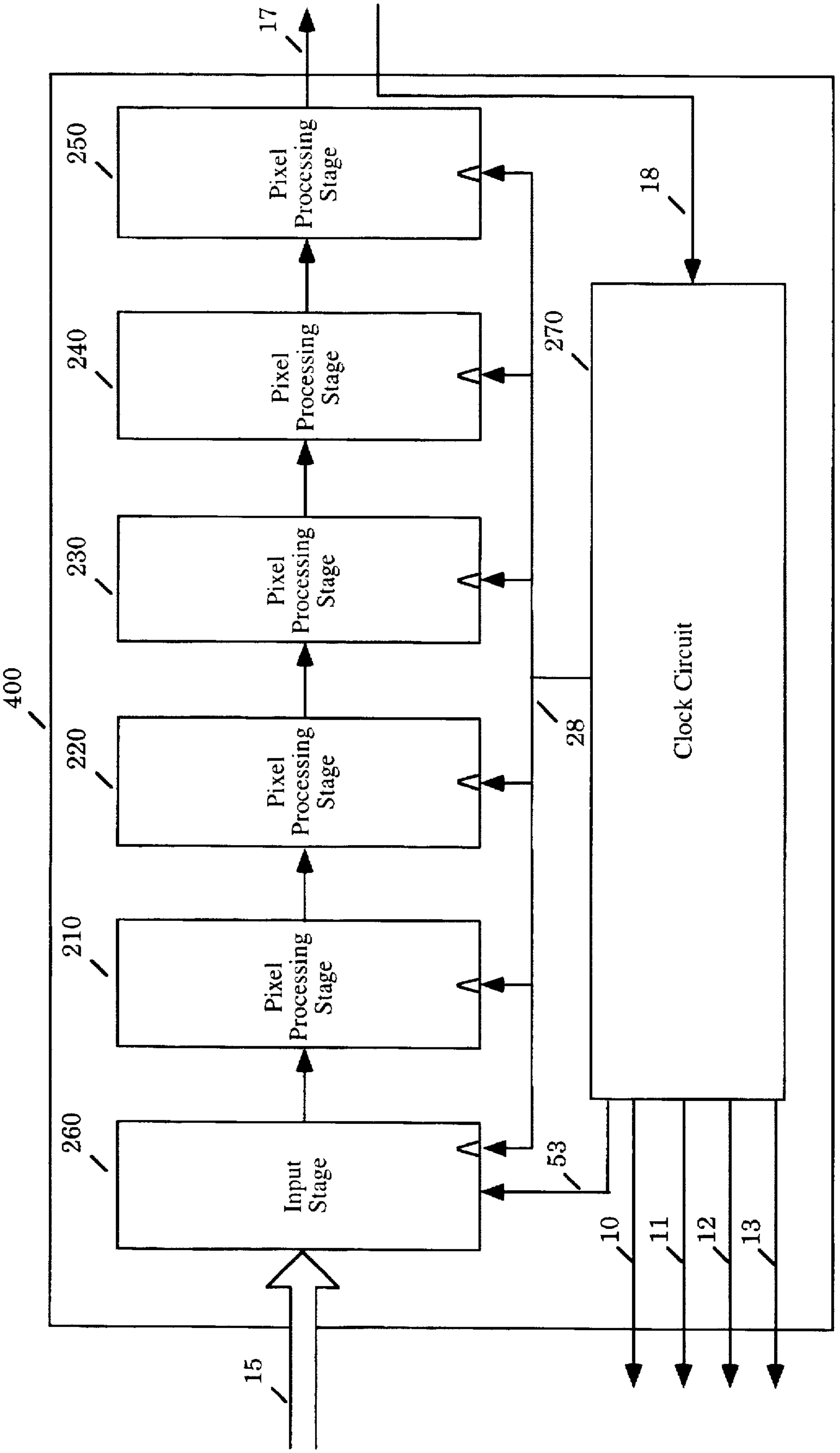
FIG. 2 is a block diagram of the memory display interface, and shows an input stage, a pixel processing pipeline which processes the pixel data received from frame buffer, and a clock circuit.

FIG. 2 is a block diagram of the MDI 400, and shows an input stage 260, a pixel processing pipeline 210–250, and a clock circuit 270. The pixel processing pipeline processes the pixel data received from the VRAM-A 300 and the VRAM-B 310. The clock circuit 270 generates the clock signals necessary to sequence the pixel data from the video bus 15, through the input stage 260 and the pixel processing pipeline 210–250, and over the pixel bus to the DAC 410.

Pixel data from the VRAM-A 300 and the VRAM-B 310 is received over the video bus 15 by the input stage 260. Thereafter, the pixel data is sequenced into the pixel processing pipeline 210–250, which processes four pixels in parallel for all three pixel depth modes. The final pixel processing stage 250 contains an output multiplexer for transferring the color pixel data to the DAC 410 over the pixel bus 17. The pixel processing stage 250 multiplexes the color pixel data from four parallel pixels to two parallel pixels for transfer to the DAC 410 over the pixel bus 17.

The video signals 19 from the DAC 410 to the display device are synchronized to a video clock 29, which is generated by a programmable clock generator (PCG) 420. The DAC 410 receives the video clock 29 from the PCG 420, and generates a pixel clock signal 18. The pixel clock signal 18 is synchronized to the video clock 29, and runs at one half the frequency of the video clock 29.

The clock circuit 270 receives the pixel clock 18 from the DAC 410, and generates the VSCLK_A 10 and the VSCLK_B 13. The clock circuit 270 also generates a pipeline clock 28 and an input control signal 53. The VSCLK_A 10, the VSCLK_B 13, the pipeline clock 28, and the input control signal 53 are all synchronized to the pixel clock 18 and the video clock 29.

The rising edge of the VSCLK_A 10 causes the VRAM-A 300 to transfer pixel data to the MDI 400 over the video bus 15. Similarly, the rising edge of the VSCLK_B 13 causes the VRAM-B 310 to transfer pixel data to the MDI 400 over the video bus 15. The input control signal 53 sequences the pixel data through the input stage 260, and into the pixel processing pipeline 210–250 according to the pixel depth mode and the frequency of the video clock 29. The pipeline clock 28 synchronizes the pixel data from the input stage 260 through the pixel processing pipeline 210–250.

The VSCLK_A 10, the VSCLK_B 13, the pipeline clock 28, the input control signal 53, and the pixel clock 18 are synchronized to the video clock 29. The timing of the VSCLK_A 10 and the VSCLK_B 13 is determined by the pixel rate required by the displayed device, by the depth of the pixel data, and by the VRAM mode. The frequencies of the pipeline clock 28, and the pixel clock 18 are determined by the pixel rate required by the display device. The frequency of the video clock 29 is determined by the pixel rate required by the display device.

For example, a 1600×1280 resolution display device running at 76 Hz requires the video clock 29 frequency of 216 MHz. The DAC 410 divides the video clock 29 by 2, and generates the pixel clock 18 at 108 MHz. The pixel clock 18 runs at one half the frequency of the video clock 29 because color pixel data for two pixels is transferred in parallel over the pixel bus 17, while the video signals 19 transmit one pixel to the display device.

The clock circuit 270 receives the pixel clock 18, and generates the pipeline clock 28 at 54 MHz, which is one half the frequency of the pixel clock 18. The pipeline clock 28 runs at one half the frequency of the pixel clock 18, and at one fourth the frequency of the video clock 29, because pixel data for four pixels is processed in parallel through the pixel processing pipeline 210–250.

In 32 bit pixel depth mode, four pixels are transferred in parallel over the video bus 15 while four pixels are processed in parallel through the pixel processing pipeline 210–250.

In single bank VRAM mode, the rising edge of the VSCLK_A 10 causes the VRAM-A 300 to transfer a combined four pixels of 32 bits each pixel over the video bus 15. Therefore, the clock circuit 270 generates the VSCLK_A 10 at the same frequency as the pipeline clock 28 when the pixel depth mode is 32 bit and the VRAM mode is single bank. For this example, the VSCLK_A 10 is generated at 54 MHz, which is equal to the frequency of the pipeline clock 28. In single bank VRAM mode VRAM bank 310 is not present.

In dual bank VRAM mode, the rising edge of the VSCLK_A 10 causes the VRAM-A 300 to transfer four pixels of 32 bits each pixel over the video bus 15, and the rising edge of the VSCLK_B 13 causes the VRAM-B 310 to transfer four pixels of 32 bits each pixel over the video bus 15. Therefore, the clock circuit 270 generates the VSCLK_A 10 and the VSCLK_B 13 each at one half the frequency of the pipeline clock 28 when the pixel depth mode is 32 bit and the VRAM mode is dual bank. Moreover, the VSCLK_A 10 and the VSCLK_B 13 are generated 180 degrees out of phase. For this example, the VSCLK_A 10 and the VSCLK_B 13 are each generated and 27 MHz, which is equal to one half the frequency of the pipeline clock 28.

In 16 bit pixel depth mode, eight pixels are transferred in parallel over the video bus 15, while only four pixels are processed in parallel through the pixel processing pipeline 210–250.

In single bank VRAM mode, the rising edge of the VSCLK_A 10 causes the VRAM-A 300 to transfer a combined eight pixels of 16 bits each pixel over the video bus 15. Therefore, the clock circuit 270 generates the VSCLK_A 10 at one half the frequency of the pipeline clock 28, or 27 MHz for this example.

In dual bank VRAM mode, the rising edge of the VSCLK_A 10 causes the VRAM-A 300 to transfer eight pixels of 16 bits each pixel over the video bus 15, and the rising edge of the VSCLK_B 13 causes the VRAM-B 310 to transfer eight pixels of 16 bits each pixel over the video bus 15. Therefore, the clock circuit 270 generates the VSCLK_A 10 and the VSCLK_B 13 each at one fourth the frequency of the pipeline clock 28, or 13.5 MHz for this example. The VSCLK_A 10 and the VSCLK_B 13 are generated 180 degrees out of phase.

In 8 bit pixel depth mode, sixteen pixels are transferred in parallel over the video bus 15, while four pixels are processed in parallel through the pixel processing pipeline 210–250.

In single bank VRAM mode, the rising edge of the VSCLK_A 10 causes the VRAM-A 300 to transfer a combined sixteen pixels of 8 bits each pixel over the video bus 15. The clock circuit 270 generates the VSCLK_A 10 at one fourth the frequency of the pipeline clock 28, or 13.5 MHz for this example.

In dual bank VRAM mode, the rising edge of the VSCLK_A 10 causes the VRAM-A 300 to transfer sixteen pixels of 8 bits each pixel over the video bus 15, and the rising edge of the VSCLK_B 13 causes the VRAM-B 310 to transfer sixteen pixels of 8 bits each pixel over the video bus 15. The clock circuit 270 generates the VSCLK_A 10 and the VSCLK_B 13 each at one eighth the frequency of the pipeline clock 28, or 6.75 MHz for this example. The VSCLK_A 10 and the VSCLK_B 13 are generated 180 degrees out of phase.

Figure 3:
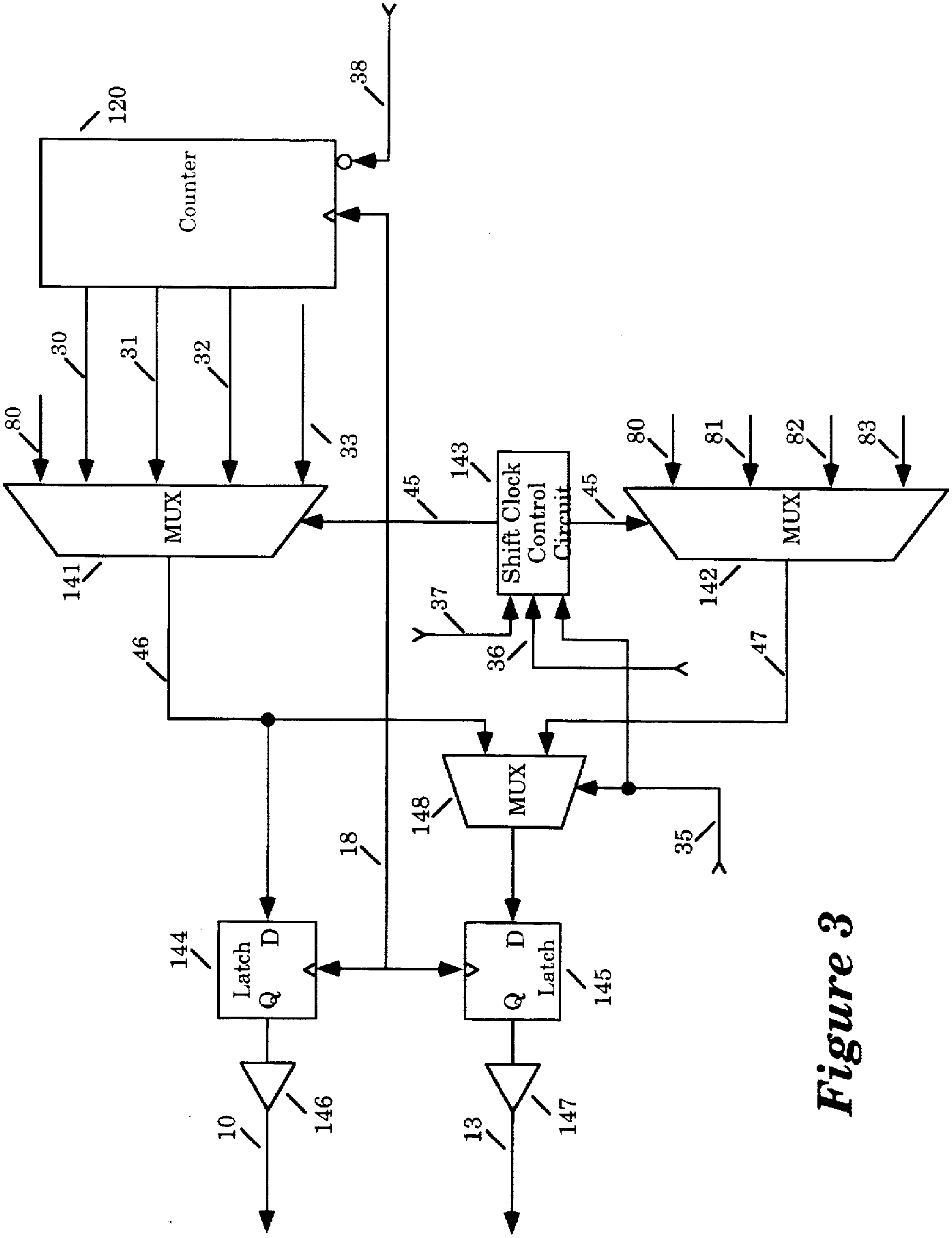
FIG. 3 is a schematic diagram of a circuit for generating the shift clock signals that synchronize pixel data transfer from the frame buffer to the memory display interface.

FIG. 3 is a schematic diagram of a circuit for generating the VSCLK_A 10 and the VSCLK_B 13. The pixel clock 18 synchronizes a free running counter 120. The counter 120 generates an SCLK_CNT[3] signal 30, an SCLK_CNT[2] signal 31, an SCLK_CNT[1] signal 32, and an SCLK_CNT[0] signal 33. The SCLK_CNT[0] signal 33 runs at one half the frequency of the pixel clock 18, and is equal to the frequency of the pipeline clock 28. The SCLK_CNT[1] signal 32 runs at one fourth the frequency of the pixel clock 18, the SCLK_CNT[2] signal 31 runs at one eight the frequency of the pixel clock 18, and the SCLK_CNT[3] signal 30 runs at one sixteenth the frequency of the pixel clock 18. An inhibit counter signal 38 resets the counter circuit 120 during a blanking interval of the display device.

A multiplexer 141 receives the SCLK_CNT signals 30–33 and a vertical inhibit signal 80. A multiplexer 142 receives a DL_VSCLK_32 signal 81, a DL_VSCLK_16 signal 82, a DL_VSCLK_8 signal 83, along with the vertical inhibit signal 80. The DL_VSCLK_32 signal 81 is generated by inverting the SCLK_CNT[1] signal 32, the DL_VSCLK_16 signal 82 is generated by inverting the SCLK_CNT[2] signal 31, and the DL_VSCLK_8 signal 83 is generated by inverting the SCLK_CNT[3] signal 30.

A shift clock control circuit 143 receives a control signal 35 which indicates the VRAM mode as set in the ACR, a control signal 36 which indicates a blanking interval for the display device, and a control signal 37 which indicates the pixel depth mode as set in the MCR. The shift clock control circuit 143 generates control signals 45 to selectively couple the inputs of the multiplexer 141 to the D input of a latch 144 and an input of a multiplexer 148. The control signals 45 also selectively couple the inputs of the multiplexer 142 to an input of the multiplexer 148.

In 8 bit pixel depth mode, the control signals 45 cause the multiplexer 141 to select the SCLK_CNT|3| signal 30 and the multiplexer 142 to select the DL_VSCLK_8 signal 83. The control signal 35 causes the multiplexer 148 to transfer the SCLK_CNT|3| signal 30 to the D input of the data latch 145 when the VRAM mode is single bank. The control signal 35 causes the multiplexer 148 to transfer the DL_VSCLK_8 signal 83 to the D input of the data latch 145 when the VRAM mode is dual bank. The pixel clock 18 synchronizes the data latches 144 and 145. The outputs of the data latches 144 and 145 are buffered by a pair of drivers 146 and 147 to provide the VSCLK_A 10 and the VSCLK_B 13.

In 16 bit pixel depth mode, the control signals 45 causes the multiplexer 141 to select the SCLK_CNT|2| signal 31 and the multiplexer 142 to select the DL_VSCLK_16 signal 82. The control signal 35 causes the multiplexer 148 to transfer the SCLK_CNT|2| signal 31 to the D input of the data latch 145 when the VRAM mode is single bank. The control signal 35 causes the multiplexer 148 to transfer the DL_VSCLK_16 signal 82 to the D input of the data latch 145 when the VRAM mode is dual bank.

In 32 bit pixel depth mode, the control signals 45 causes the multiplexer 141 to select the SCLK_CNT[1] signal 32 and the multiplexer 142 to select the DL_VSCLK_32 signal 81. The control signal 35 causes the multiplexer 148 to transfer the SCLK_CNT[1] signal 32 to the D input of the data latch 145 when the VRAM mode is single bank. The control signal 35 causes the multiplexer 148 to transfer the DL_VSCLK_32 signal 81 to the D input of the data latch 145 when the VRAM mode is dual bank.

Figure 4:
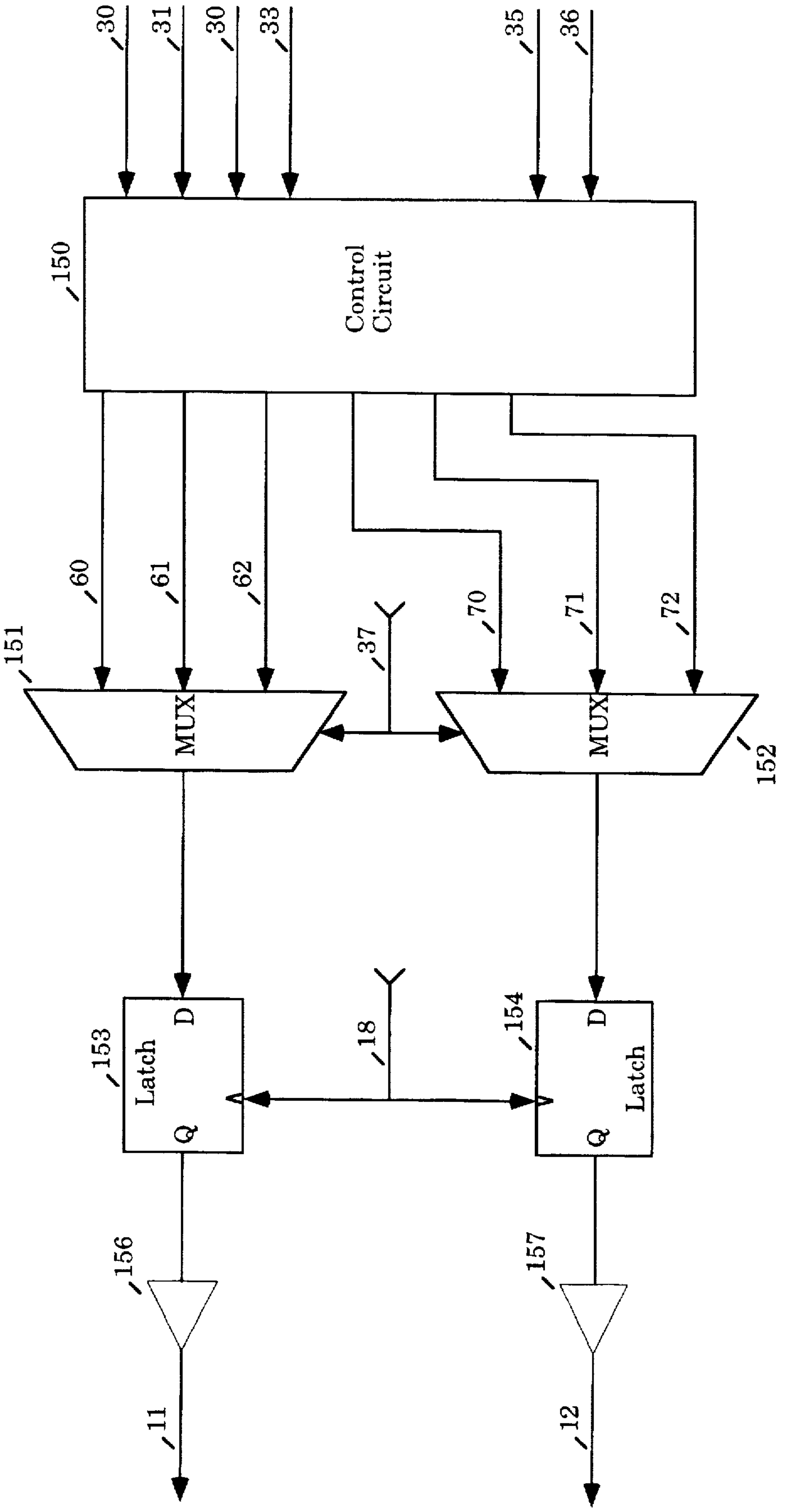
FIG. 4 is a schematic diagram of a circuit for generating the serial output enable signals to enable and disable the output drivers of the VRAMs in the frame buffer.

FIG. 4 is a schematic diagram of a circuit for generating the SOE_A 11 and the SOE_B 12. A control circuit 150 receives the SCLK_CNT signals 30 PHH/sz 33, as well as the control signals 35 and 36. The control circuit 150 generates an SOE_A_32 signal 60, an SOE_A_16 signal 61, and an SOE_A_8 signal 62. The SOE_A_32 signal 60 is for enabling and disabling the output drivers of the VRAM-A 300 during 32 bit VRAM mode. The SOE_A_16 signal 61 and the SOE_A_8 signal 62 are for enabling and disabling the output drivers of the VRAM-A 300 during 16 bit and 8 bit VRAM modes, respectively.

The control circuit 150 also generates an SOE_B_32 signal 70, and SOE_B_16 signal 71, and an SOE_B_8 signal 72. The SOE_B 32 signal 70 is for enabling and disabling the output drivers of the VRAM-B 310 during 32 bit VRAM mode. The SOE_B_16 signal 71 and the SOE_B_8 signal 72 are for enabling and disabling the output drivers of the VRAM-B 310 during 16 bit and 8 bit VRAM modes, respectively.

In 32 bit pixel depth mode, the control signal 37 causes a multiplexer 151 to couple the SOE_A_32 signal 60 to the D input of a data latch 153, and causes a multiplexer 152 to couple the SOE_B_32 signal 70 to the D input of a data latch 154. In 16 bit pixel depth mode, the control signal 37 causes the multiplexer 151 to couple the SOE_A_16 signal 61 to the D input of the data latch 153, and causes the multiplexer 152 to couple the SOE_B_16 signal 71 to the D input of the data latch 154. In 8 bit pixel depth mode, the control signal 37 causes the multiplexer 151 to couple the SOE_A_8 signal 62 to the D input of the data latch 153, and causes the multiplexer 152 to couple the SOE_B_8 signal 72 to the D input of the data latch 154.

The data latches 153 and 154 are synchronized by the pixel clock 18. A driver 156 transmits the SOE_A 11 to the VRAM-A 300, while a driver 157 transmits the SOE_B 12 to the VRAM-A 310.

The functions of the control circuit 150 are defined by the following logical equations:

SOE_A_32 signal 60=(sclk_cnt_|0| or sclk_cnt_|1| or control signal 35) and (control signal 36 or control signal 35);

SOE_B_32 signal 70=(sclk_cnt_|0| or sclk_cnt |1| or control signal 35);

SOE_A_16 signal 61=(sclk_cnt_|1| or sclk_cnt_|2| or control signal 35) and (control signal 36 or control signal 35);

SOE_B_16 signal 71=(sclk_cnt_|1| or sclk_cnt |2| or control signal 35);

SOE_A_8 signal 62=(sclk_cnt_|2| or sclk_cnt_|3| or control signal 35) and (control signal 36 or control signal 35);

SOE_B_8 signal 72 =(sclk_cnt_|2| or sclk_cnt |3| or control signal 35).

Figure 5:
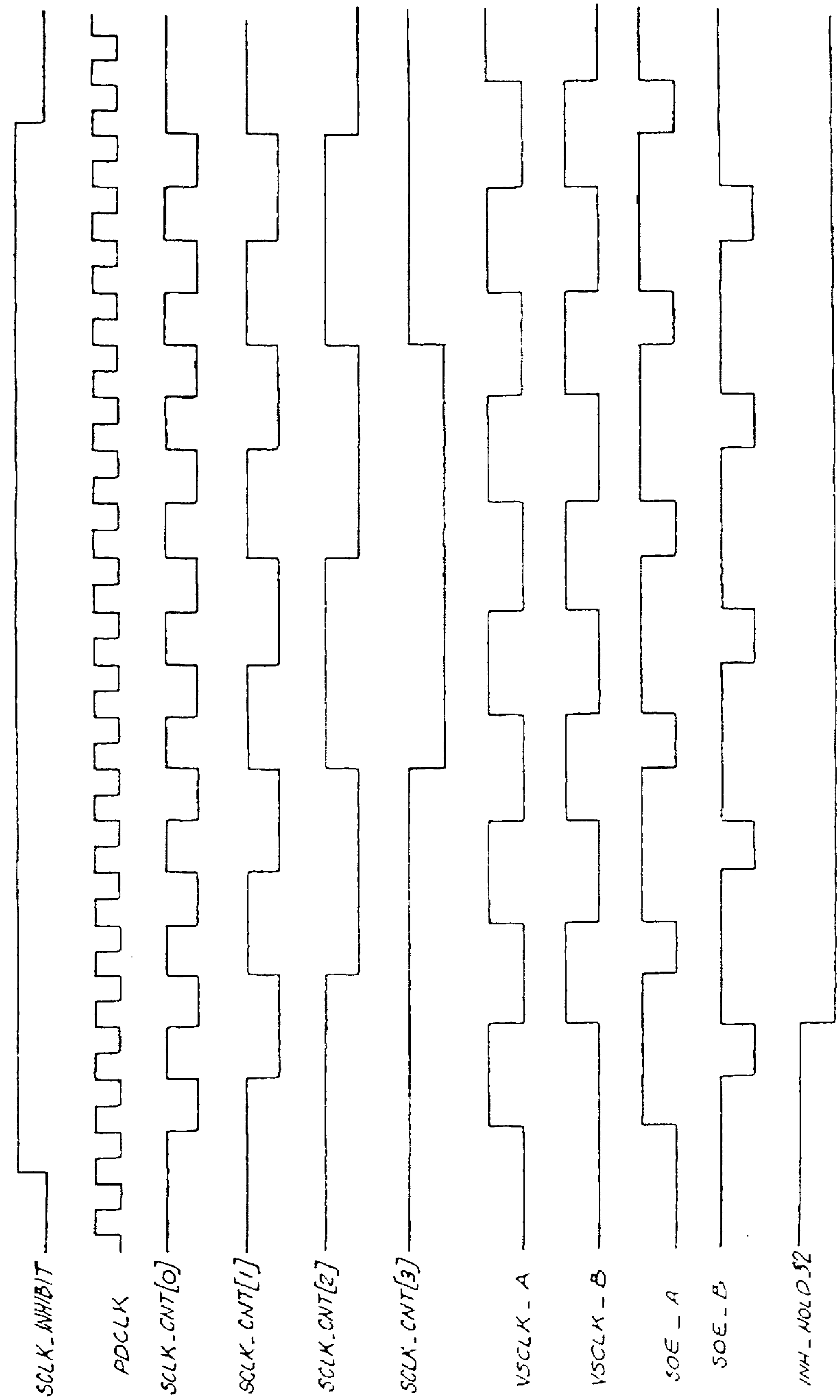
FIG. 5 is a timing diagram illustrating the shift clock and serial output enable signals for transferring pixel data over the video bus when the VRAM mode is dual bank and the pixel depth mode is 32 bits.

FIG. 5 is a timing diagram illustrating the shift clock and serial output enable signals for transferring pixel data over the video bus 15 when the VRAM mode is dual bank and the pixel depth mode is 32 bits. The timing of the VSCLK_A 10 and the VSCLK_B 13 is shown, as well as the timing of the SOE_A 11 and the SOE_B 12. Also shown is the timing for the SCLK_CNT signals 30–33 (SCLK_CNT[0], SCLK_CNT|1|, SCLK_CNT[2], and SCLK_CNT[3]) and the vertical inhibit signal 80 (INH_HOLD_32). The signals are referenced to the pixel clock 18 (PD_CLOCK).

Figure 6:
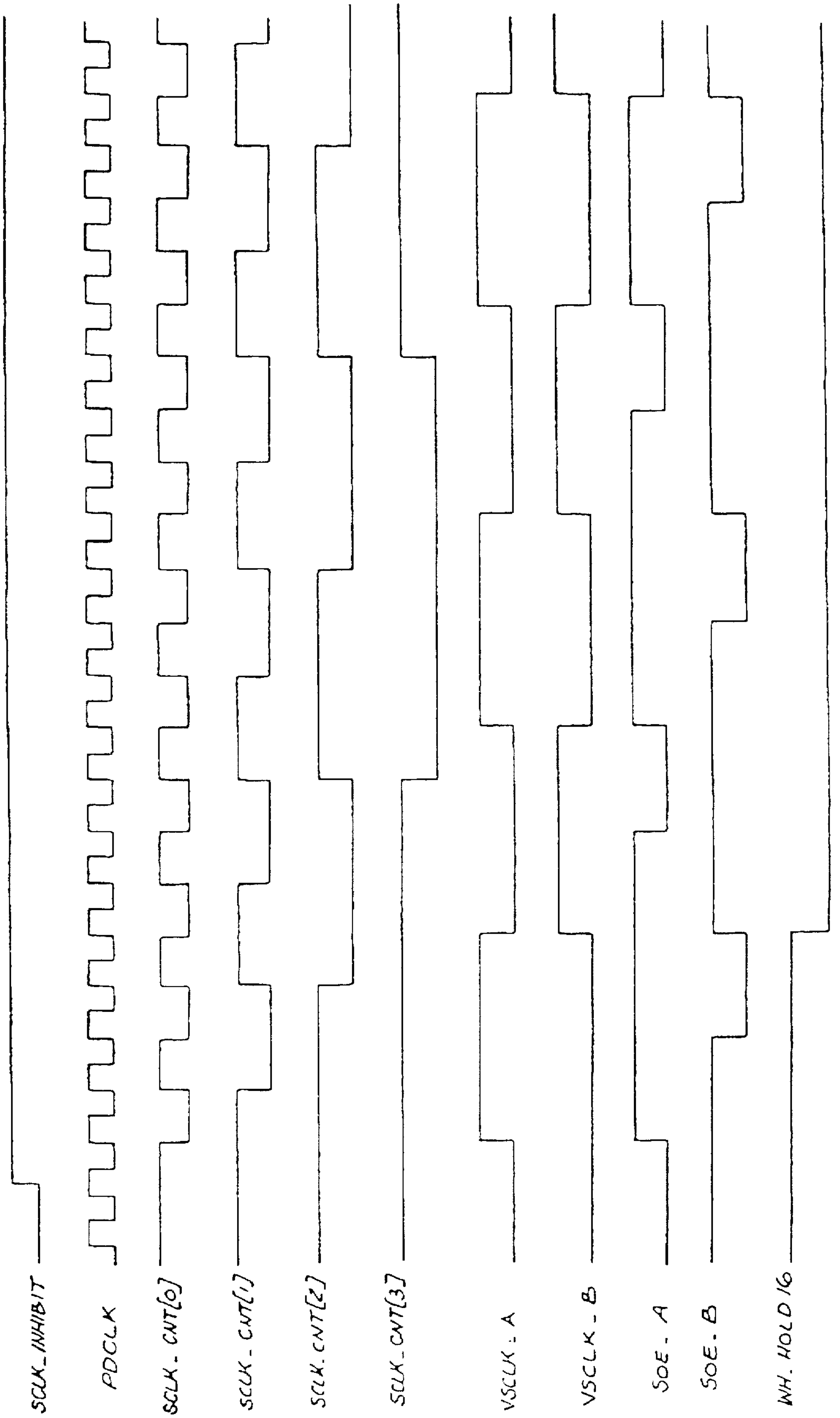
FIG. 6 is a timing diagram illustrating the shift clock and serial output enable signals for transferring pixel data over the video bus when the VRAM mode is dual bank and the pixel depth mode is 16 bits.

FIG. 6 is a timing diagram showing the VSCLK_A 10 and the VSCLK_B 13, the SOE_A 11, and the SOE_B 12 when the VRAM mode is dual bank and the pixel depth mode is 16 bits. Also shown is the timing for the SCLK_CNT signals 30–33 and the vertical inhibit signal 80 (INH_HOLD_16).

Figure 7:
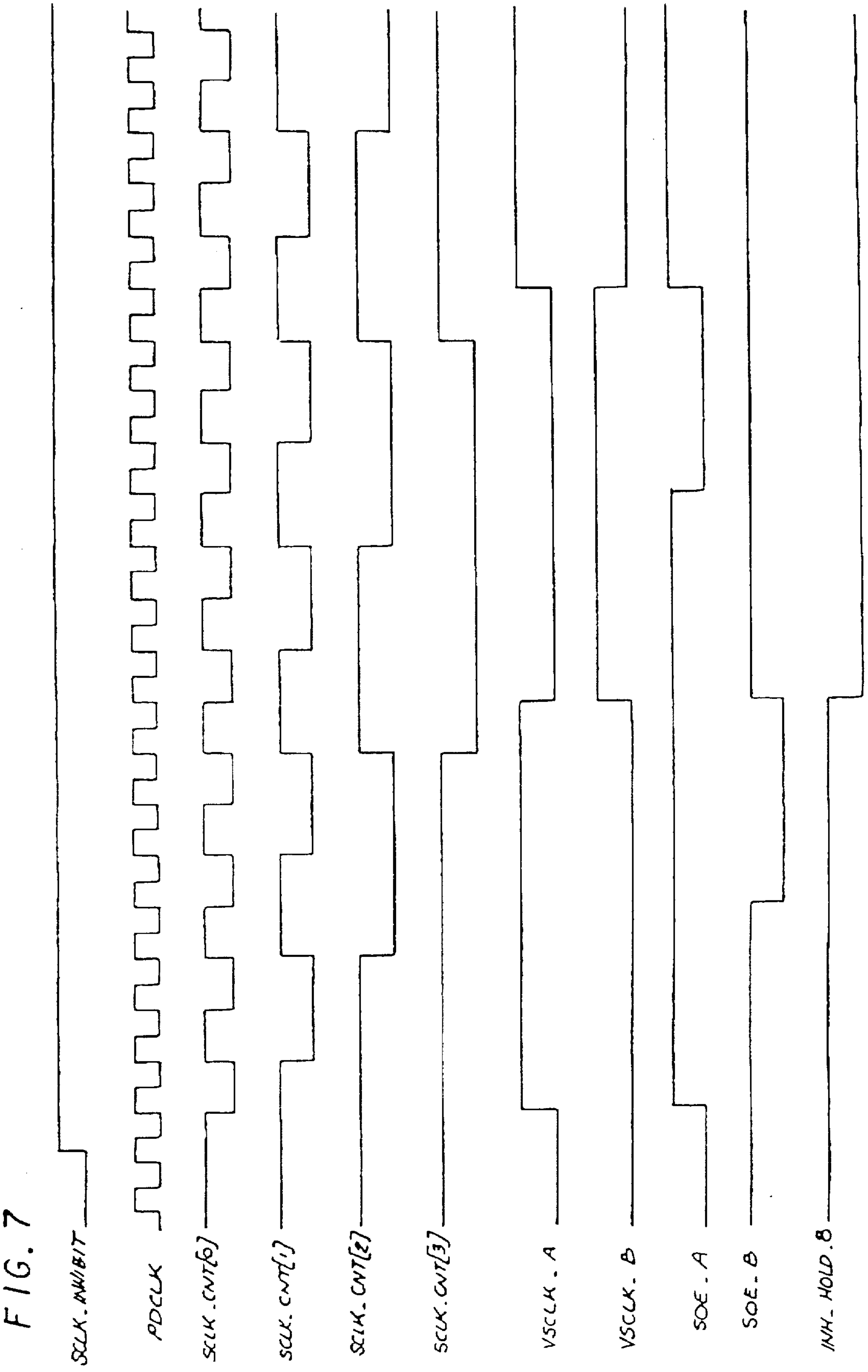
FIG. 7 is a timing diagram illustrating the shift clock and serial output enable signals for transferring pixel data over the video bus when the VRAM mode is dual bank and the pixel depth mode is 8 bits.

FIG. 7 is a timing diagram showing the VSCLK_A 10 and the VSCLK_B 13, the SOE_A 11, and the SOE_B 12 when the VRAM mode is dual bank and the pixel depth mode is 8 bits. Also shown is the timing for the SCLK_CNT signals 30–33 and the vertical inhibit signal 80 (INH_HOLD_8).

The embodiment disclosed above allows for no overlap of enabled data on the video bus 15. That embodiment eliminates any possibility of bus contention on the video bus 15.

For another embodiment involving high speed bank switching, the VRAM bank 300 is switched off at the same time as VRAM bank 301 is switched on to allow maximum enable time for the VRAM banks. This is accomplished by driving SOE_A 11 with the signal VSCLK_A 10 and driving SOE_B 12 with the inverse of VSCLK_A 10. The alternative embodiment may employ an inverter external to the MDI 400 or may be incorporated into the MDI 400 as an optional operational mode. In the foregoing specification the invention has been described with reference specific exemplary embodiments thereof. It will, however, be evident that various modifications and changes may be made thereto without departing from the broader spirit and scope of the invention as set forth in the appended claims. The specifications and drawings are accordingly to be regarded as illustrative rather than restrictive.

What is claimed is:

1. A graphics subsystem, comprising:

first and second video memory banks each coupled to store a set of pixel data;

memory display interface coupled receive a set of input pixel data values from the video memory banks over a video bus, the memory display interface processing a set of N pixel data values in parallel utilizing a plurality of pixel processing stages synchronized by a pipeline clock wherein N is a number greater than zero, and transferring a set of N/2 pixel data values over a pixel bus, the memory display interface generating a first shift clock to read the input pixel data values from the first video memory bank and generating a second shift clock to read the input pixel data values from the second video memory bank, the first and second shift clocks and the pipeline clock each having a frequency determined by a frequency of a display device for the graphics subsystem and by a width of the pixel data in the video memory banks and by the number N;

digital-to-analog converter that generates a set of video signals for the display device and that generates a pixel clock to synchronize the pixel bus according to a video clock for the display device.

2. The graphics subsystem of claim 1, wherein the memory display interface comprises:

pixel processing pipeline comprising a set of pixel processing stages each capable of processing the N pixel data values in parallel, the pixel processing pipeline having a final pixel processing stage that transfers the N/2 pixel data values over the pixel bus;

input stage coupled to receive the input pixel data values from the video memory banks over the video bus, the input stage coupled to transfer the input pixel data values into the pixel processing pipeline such that N of the input pixel data values are provided to the pixel processing pipeline during each of a plurality of cycles of the pipeline clock;

clock circuit that generates the pipeline clock and that generates the first and second shift clocks each having a frequency determined by the frequency of the display device as indicated by a frequency of the pixel clock and by the width of the pixel data in the video memory banks and by the number N, the clock circuit further generating a first and a second serial output enable signal to enable and disable the first and second video memory banks.

3. The graphics subsystem of claim 2, wherein the clock circuit receives the pixel clock that synchronizes the N/2 pixel data values on the pixel bus, and generates the pipeline clock to synchronize the pixel processing pipeline at a frequency equal to one half a frequency of the pixel clock.

4. The graphics subsystem of claim 3, wherein the width of the pixel data comprises 32 bits such that the clock circuit generates the frequency of the first and second shift clocks each at one half the frequency of the pipeline clock.

5. The graphics subsystem of claim 3, wherein the width of the pixel data comprises 16 bits such that the clock circuit generates the frequency of the first and second shift clocks each at one fourth the frequency of the pipeline clock.

6. The graphics subsystem of claim 3, wherein the width of the pixel data comprises 8 bits such that the clock circuit generates the frequency of the first and second shift clocks each at one eighth the frequency of the pipeline clock.

7. The graphics subsystem of claim 3, wherein the width of the pixel data comprises 32 bits such that the clock circuit generates the frequency of the first shift clock equal to the frequency of the pipeline clock.

8. The graphics subsystem of claim 3, wherein the width of the pixel data comprises 16 bits such that the clock circuit generates the frequency of the first shift clock at one half the frequency of the pipeline clock.

9. The graphics subsystem of claim 3, wherein the width of the pixel data comprises 8 bits such that the clock circuit generates the frequency of the first shift clock at one fourth the frequency of the pipeline clock.

* * * * *